United States Patent
Tsuzuki et al.

(10) Patent No.: US 9,868,323 B2
(45) Date of Patent: Jan. 16, 2018

(54) VEHICLE APPROACH ALERT DEVICE

(71) Applicant: ANDEN CO., LTD., Anjo, Aichi-pref. (JP)

(72) Inventors: Haruyuki Tsuzuki, Anjo (JP); Tsutomu Suzuki, Anjo (JP); Hitoshi Sakamoto, Anjoy (JP)

(73) Assignee: ANDEN CO., LTD., Anjo (JP)

( * ) Notice: Subject to any disclaimer, the term of this patent is extended or adjusted under 35 U.S.C. 154(b) by 104 days.

(21) Appl. No.: 14/786,565

(22) PCT Filed: May 16, 2013

(86) PCT No.: PCT/JP2013/003121
§ 371 (c)(1),
(2) Date: Oct. 23, 2015

(87) PCT Pub. No.: WO2014/184829
PCT Pub. Date: Nov. 20, 2014

(65) Prior Publication Data
US 2016/0068102 A1 Mar. 10, 2016

(51) Int. Cl.
G08G 1/01 (2006.01)
B60C 5/00 (2006.01)
G10K 9/13 (2006.01)

(52) U.S. Cl.
CPC ............... *B60C 5/008* (2013.01); *G10K 9/13* (2013.01)

(58) Field of Classification Search
CPC .................................. B60Q 5/008; G10K 9/13
See application file for complete search history.

(56) References Cited

U.S. PATENT DOCUMENTS 3,974,499 A * 8/1976 Shigemori ............. G10K 1/067
340/384.7
4,149,153 A * 4/1979 Shigemori ............. G10K 1/067
340/384.73
(Continued)

FOREIGN PATENT DOCUMENTS

EP 2 760 220 B1 2/2016
JP 09-158799 * 12/1995
(Continued)

OTHER PUBLICATIONS

International Search Report and Written Opinion of the International Searching Authority dated Aug. 20, 2013 issued in the corresponding International application No. PCT/JP2013/003121 (and English translation).
Office Action dated Oct. 15, 2014 issued in corresponding JP patent application No. 2011-276000 (and English translation).

*Primary Examiner* — Quang D Pham
(74) *Attorney, Agent, or Firm* — Posz Law Group, PLC

(57) ABSTRACT

A vehicle approach alert device includes: a microcomputer having a memory that stores approach alert sound data, and a signal generator that generates an approach alert sound voltage waveform signal based on the approach alert sound data. The vehicle approach alert device alerts approach of a vehicle by outputting a vehicle approach alert sound from a sound outputting body according to the approach alert sound voltage waveform signal. The microcomputer further includes: an obtaining device that obtains a sound outputting body temperature; and a sound pressure correcting device that corrects a voltage level of the approach alert sound voltage waveform signal to be larger as the sound outputting body temperature increases.

2 Claims, 3 Drawing Sheets

(56) References Cited

U.S. PATENT DOCUMENTS

| | | | | |
|---|---|---|---|---|
| 5,635,903 | A * | 6/1997 | Koike | A63H 17/34 340/384.1 |
| 7,979,147 | B1 * | 7/2011 | Dunn | G10K 15/02 181/192 |
| 9,013,284 | B2 * | 4/2015 | Nakayama | B60Q 5/008 340/384.3 |
| 2003/0220722 | A1 * | 11/2003 | Toba | G10K 15/02 701/1 |
| 2008/0119994 | A1 * | 5/2008 | Kameyama | B60W 40/08 701/48 |
| 2010/0109855 | A1 | 5/2010 | Liao et al. | |
| 2011/0044470 | A1 | 2/2011 | Ogata | |
| 2012/0106748 | A1 | 5/2012 | Peachey et al. | |
| 2012/0194328 | A1 * | 8/2012 | Nakayama | B60Q 5/008 340/425.5 |
| 2012/0229267 | A1 | 9/2012 | Nakayama | |
| 2012/0242468 | A1 * | 9/2012 | Nakayama | B60Q 5/008 340/425.5 |
| 2012/0300949 | A1 | 11/2012 | Rauhala et al. | |

FOREIGN PATENT DOCUMENTS

| | | |
|---|---|---|
| JP | H09-158799 A | 6/1997 |
| JP | 2009-035195 A | 2/2009 |
| JP | 2009-101895 A | 5/2009 |
| WO | 2014/184827 A1 | 11/2014 |
| WO | 2014/184828 A1 | 11/2014 |

\* cited by examiner

VEHICLE APPROACH ALERT DEVICE

CROSS REFERENCE TO RELATED APPLICATION

This application is a U.S. national stage of International Application No. PCT/JP2013/003121 filed on May 16, 2013 and is based on Japanese Patent Application No. 2011-276000 filed on Dec. 16, 2011, the disclosures of which are incorporated herein by reference.

TECHNICAL FIELD

The present disclosure relates to a vehicle approach alert device for alerting in a surrounding area by outputting a sound from a vehicle that the vehicle approaches.

BACKGROUND ART

Recently, an electric vehicle (i.e., EV) and a hybrid vehicle (i.e., HV) have a structure for generating a small noise. Thus, it is difficult for a pedestrian to find these vehicles approaching the pedestrian. In order to increase a recognition degree of the vehicle disposed near and around the pedestrian or the like, the vehicle approach alert device for generating artificial engine sound is mounted on these vehicles (see, for example, Patent Literature 1).

The vehicle approach alert device outputs an approach alert sound such as a pseudo travelling sound via a speaker. When a sound pressure of an output from the speaker is large, a noise becomes a problem although a warning efficiency increases. On the other hand, when the sound pressure of then output from the speaker is small, the warning efficiency decreases although the noise is reduced. Accordingly, the sound pressure of then output from the speaker is set with a certain level for satisfying both the noise reduction and the warning efficiency.

However, the vehicle approach alert device is mounted on the vehicle, so that the speaker is influenced by environmental temperature around the vehicle. Specifically, the speaker is arranged on an outside of a compartment such as in an engine room. The usage temperature range in the engine room is very wide (a width of the range is 150° C.) such as in a range between −40° C. and 110° C. Thus, the influence to the speaker becomes large. For example, material of a voice coil in the speaker is copper. A temperature coefficient of a resistivity of copper is about 4000 ppm/° C. Thus, the impedance of the voice coil is changed about 60% within the temperature range of 150° C. Thus, the sound pressure of the output from the speaker is shown by a following equation. Thus, the sound pressure is reduced when the temperature increases. In the temperature range of 150° C., the sound pressure is simply reduced by 4 dB according to only the temperature change.

1/(SPEAKER IMPEDANCE)∝(SPEAKER CURRENT)∝(SOUND PRESSURE OF SPEAKER OUTPUT) (Equation 1)

Specifically, when a mounting position of the speaker is in the engine room, the sound pressure of sound from the speaker is reduced since the temperature in the engine room largely increases after and before driving the vehicle. Thus, the warning efficiency is reduced.

PRIOR ART LITERATURES

Patent Literature

Patent Literature 1: JP-2009-35195 A

SUMMARY OF INVENTION

It is an object of the present disclosure to provide a vehicle approach alert device that restricts a change in the sound pressure of the output from the speaker or the like caused by temperature change, and restricts the reduction of the warning efficiency.

According to an example aspect of the present disclosure, a vehicle approach alert device includes: a microcomputer having a memory that stores approach alert sound data to be output, and a signal generator that reads out the approach alert sound data from the memory and generates an approach alert sound voltage waveform signal indicative of a vehicle approach alert sound to be output based on the approach alert sound data. The vehicle approach alert device alerts approach of a vehicle by outputting the vehicle approach alert sound from a sound outputting body according to the approach alert sound voltage waveform signal output from the microcomputer. The microcomputer further includes: an obtaining device that obtains a sound outputting body temperature as temperature of the sound outputting body; and a sound pressure correcting device that corrects a voltage level of the approach alert sound voltage waveform signal generated by the signal generator to be larger as the sound outputting body temperature obtained by the obtaining device increases. The signal generator outputs a corrected approach alert sound voltage waveform signal of the sound pressure correcting device.

In the above vehicle approach alert device, the voltage level of the approach alert sound voltage waveform signal is corrected according to the sound outputting body temperature, so that the sound pressure level of the vehicle approach alert sound actually output from the sound outputting body is constant. Accordingly, the change of the sound pressure of the outputting sound from the sound outputting body with respect to the temperature change is restricted, and the reduction of the warning efficiency is restricted. Thus, both of the noise reduction and the warning efficiency are satisfied even when the temperature of the sound outputting body is changed.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

First Embodiment

Figure 1:
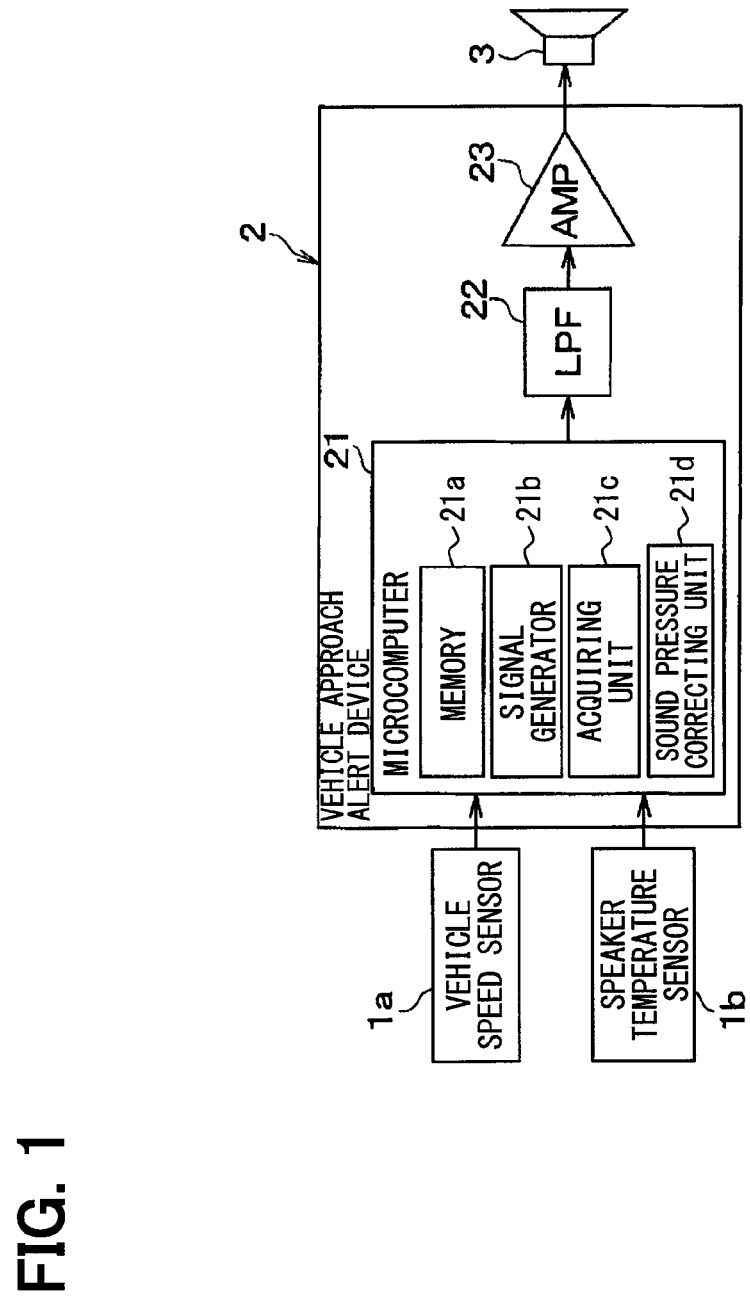
FIG. 1 is a block diagram showing a vehicle approach alert system including a vehicle approach alert device according to a first embodiment.

FIG. 1 is a block diagram showing a vehicle approach alert system including a vehicle approach alert device according to the present embodiment. With reference to the drawing, the vehicle approach alert system including the vehicle approach alert device according to the present embodiment will be explained.

As shown in FIG. 1, the vehicle approach alert system includes various sensors 1a, 1b, the vehicle approach alert device 2 and the speaker 3. In the vehicle approach alert system, the vehicle approach alert device 2 outputs a pseudo travelling sound from the speaker 3 as a sound generator based on a travelling status detection signal transmitted from various sensors 1a, 1b when the vehicle travels with a low speed and a low road noise, so that the vehicle approach alert device 2 alerts a pedestrian or the like around the vehicle that the vehicle approaches. Here, the vehicle approach alert device 2 is separated from the speaker 3. Alternatively, the vehicle approach alert device 2 and the speaker 3 may be integrated into one body.

Various sensors 1a, 1b includes a vehicle speed sensor 1a and a speaker temperature sensor 1b. The vehicle speed sensor is outputs a vehicle speed detection signal of the vehicle, and the speaker temperature sensor 1b is attached to, for example, a periphery of the voice coil of the speaker 3 so that the sensor 1b outputs a temperature detection signal indicative of the temperature of the speaker 3. The vehicle approach alert device 2 receives detection signals indicative of the vehicle speed and the speaker temperature from the vehicle speed sensor 1a and the speaker temperature sensor 1b. According to the vehicle speed and the speaker temperature, the device 2 controls to output the sound.

The vehicle approach alert device 2 includes a microcomputer 21, a low pass filter (i.e., LPF) 22, and a power amplifier (i.e., AMP) 23.

The microcomputer 21 includes a memory as a memory unit 21a and a processing unit. Further, the microcomputer 21 includes a signal generator 21b for generating an approach alert sound voltage waveform signal. The memory stores an approach alert sound data such as PCM data, and a control program for the output of the vehicle approach alert sound including a correction calculation program association with the speaker temperature. Using the stored information, the processing unit in the microcomputer 21 determines whether the sound is output based on the vehicle speed indicated in the vehicle speed detection signal, and further, reads out the approach alert sound data with a predetermined replay speed. Further, the processing unit outputs the approach alert sound voltage waveform signal corresponding to the approach sound data from the signal generator 21b.

Specifically, the processing unit in the microcomputer 21 includes an acquiring unit 21c for acquiring the vehicle speed and the speaker temperature, and a sound pressure correcting unit 21d for correcting the approach alert sound voltage waveform signal to set the sound pressure to be constant with respect to the change of the speaker temperature, and for controlling the sound output of the vehicle approach alert sound according to the corrected approach alert sound voltage waveform signal.

The acquiring unit 21c receives the temperature detection signal from the speaker temperature sensor 1b and the vehicle speed detection signal from the vehicle speed sensor 1a. Based on these signals, the unit 21c acquires the vehicle speed and the speaker temperature. The sound pressure correcting unit 21d corrects the voltage level of the approach alert sound voltage waveform signal according to the speaker temperature when the vehicle speed obtained by the acquiring unit 21c is smaller than a predetermined speed (for example, 20 km/h). Specifically, as described later, the unit 21d calculates an amplitude coefficient k of the approach alert sound voltage waveform signal. The sound pressure correcting unit 21d generates corrected approach alert sound voltage waveform signal by multiplying the calculated amplitude coefficient k by the approach alert sound voltage waveform signal, and then, outputs the corrected approach alert sound voltage waveform signal via the signal generator 21b.

Specifically, the temperature correcting unit calculates the amplitude coefficient k corresponding to the speaker temperature obtained by the acquiring unit 21c using the map or the calculation equation stored in the memory. The memory stores the calculation equation or the map indicative of the relationship between the temperature and the sound pressure level in the temperature range, which is assumed as the temperature change at a place where the speaker 3 is mounted. The speaker temperature is assigned to the calculation equation so that the amplitude coefficient k is calculated. Alternatively, the amplitude coefficient k corresponding to the speaker temperature is selected in the map.

Figure 2:
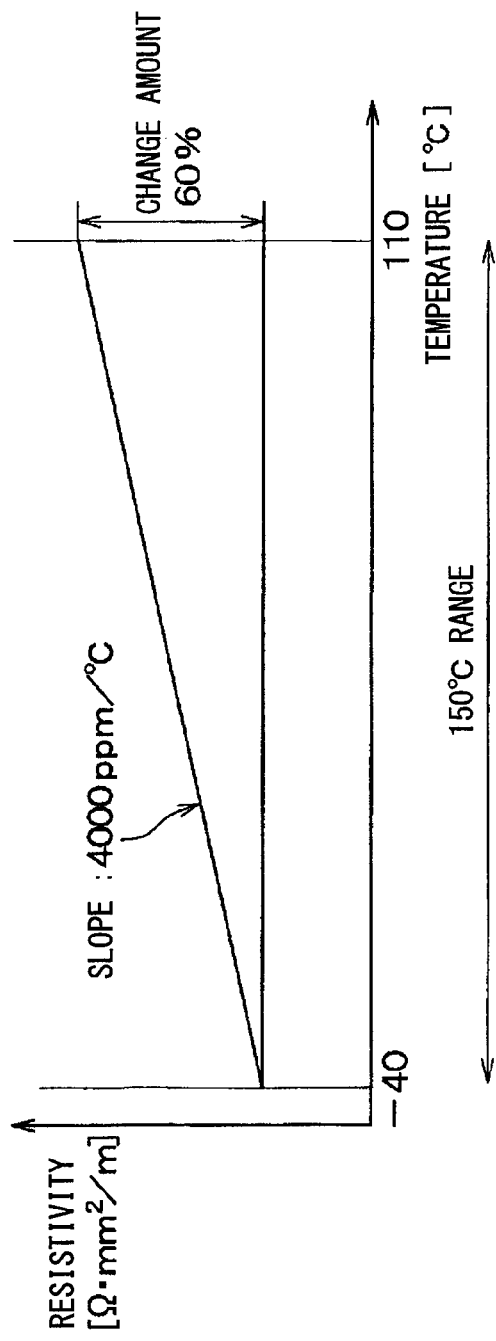
FIG. 2 is a diagram showing a temperature dependency of a resistivity of a voice coil in a speaker.
Figure 3:
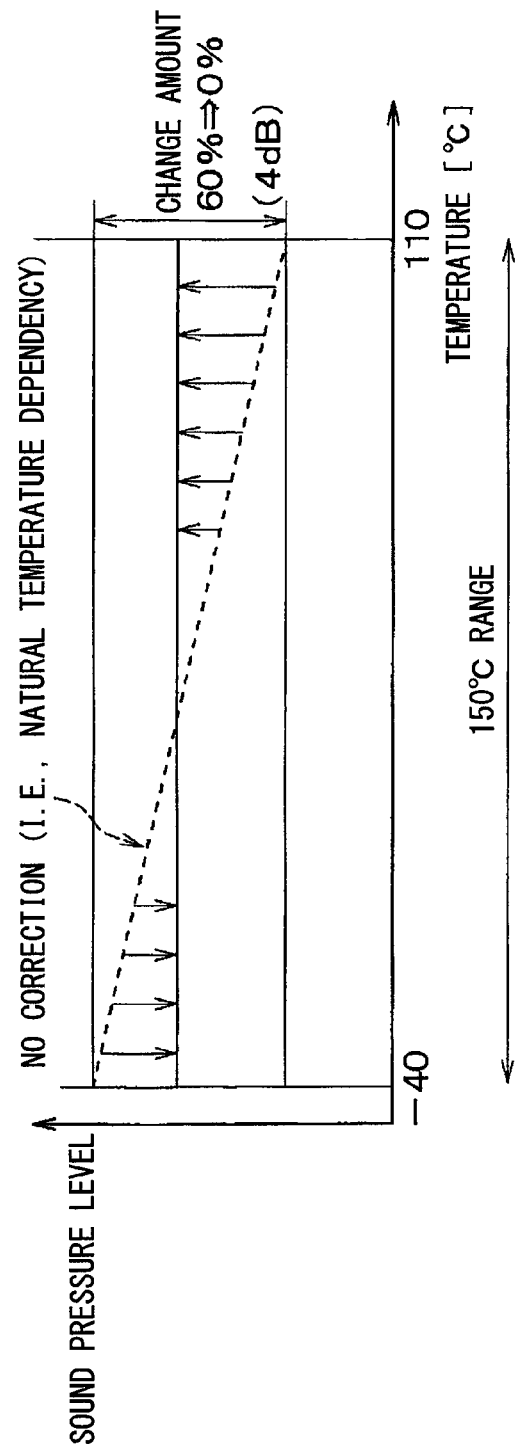
FIG. 3 is a diagram showing a relationship between temperature and a sound pressure level.

FIG. 2 is a diagram showing the temperature property of the resistivity in the voice coil of the speaker. FIG. 3 is a diagram showing the relationship between the temperature and the sound pressure level.

As shown in FIG. 2, for example, the material of the voice coil in the speaker 3 is copper. The temperature coefficient of the resistivity of copper is about 4000 ppm/° C. Thus, the impedance of the voice coil is changed about 60% in the temperature range of 150° C.

Accordingly, as shown as a broken line in FIG. 3, when the voltage level of the approach alert sound voltage waveform signal is not changed according to the temperature change, the sound pressure level of the vehicle approach alert sound actually output from the speaker 3 is reduced according to the temperature increase. For example, when the temperature change is in a range between −40° C. and 110° C., the sound pressure level is roughly reduced by 4 dB because of only the influence of the temperature change in the range of 150° C. Thus, the temperature correcting unit calculates the amplitude coefficient k according to the speaker temperature, and corrects the sound pressure level of the outputting sound of the speaker 3 by multiplying the amplitude coefficient k by the approach alert sound voltage waveform signal. Thus, when the vehicle approach alert sound is output from the speaker 3, the sound pressure level is set to be constant.

Specifically, the voltage level of the approach alert sound voltage waveform signal is corrected in such a manner that the amplitude coefficient k becomes larger as the speaker temperature increases. For example, in a case where the sound pressure level of the outputting sound of the speaker 3 is set at room temperature (e.g., around 25° C.) as the standard temperature, and the sound pressure level at the standard temperature is set to be satisfied with both of the noise reduction and the warning efficiency, the amplitude coefficient k is set to satisfy the equation of "k<1," and the voltage level of the approach alert sound voltage waveform signal is reduced when the temperature is lower than the standard temperature; and the amplitude coefficient k is set to satisfy the equation of "k>1," and the voltage level of the approach alert sound voltage waveform signal is increased when the temperature is higher than the standard temperature. Thus, although the sound pressure level of the outputting sound in the speaker 3 has the temperature property shown as the broken line in FIG. 3, the sound pressure level is corrected to be constant shown as the solid line in FIG. 3.

Although the sound pressure level of the outputting sound in the speaker 3 is constant, it is not necessary to be the same fixed sound pressure level. Alternatively, the change of the sound pressure level in the usage temperature range is, for example, within a predetermined range (e.g., within 2 dB) having a certain width.

The LPF 22 corresponds to a filter unit. The approach alert sound voltage waveform signal output from the signal generator 21b in the microcomputer 21 is input into the LPF 22, so that a noise component having a high frequency is removed, and the approach alert sound voltage waveform signal after the noise component is removed is generated. For example, the LPF 22 stores a voltage, corresponding to the output from the voltage control unit, in the capacitor of the LPF 22. Then, the voltage is output to the amplifier 23.

The amplifier 23 flows current in the speaker 3 based on the applied voltage from a constant voltage power source not shown, the current corresponding to the output of the LPF 22. The sound pressure of the outputting sound from the speaker 3 is determined by the magnitude (i.e., the amplitude) of the current supplied from the amplifier 23. The magnitude of the current supplied from the amplifier 23 is determined by the waveform of the output from the LPF 22 corresponding to the PWM output. Accordingly, the current to be flown by the amplifier 23 is changed according to the approach alert sound voltage waveform signal, of which the voltage level (i.e., the amplitude) is corrected according to the correction based on the speaker temperature.

As described above, the vehicle approach alert device according to the present embodiment corrects the voltage level of the approach alert sound voltage waveform signal according to the speaker temperature, so that the sound pressure level of the vehicle approach alert sound actually output from the speaker 3 is set to be constant. Accordingly, the change of the sound voltage of the outputting sound from the speaker 3 association with the temperature change is restricted. Thus, it is possible to restrict the reduction of the warning efficiency. Thus, even when the temperature of the speaker 3 changes, both of the noise reduction and the warning efficiency are satisfied.

Other Embodiments

In the above embodiment, the sound pressure level of the vehicle approach alert sound actually output from the speaker 3 is fixed or disposed in the predetermined range. The sound pressure level of the vehicle approach alert sound may be controlled in accordance with the vehicle travelling state such as the vehicle speed or the acceleration opening degree. For example, as the vehicle speed or the acceleration opening degree increases, the sound pressure level of the vehicle approach alert sound is controlled to be larger. Thus, the pedestrian recognizes that the approach of the vehicle is fast or the acceleration amount of the vehicle is large.

In the above case, in general, the vehicle state and the sound pressure level of the vehicle approach alert sound have a certain constant relationship. When the speaker temperature changes, the relationship also changes. Thus, in this case, the amplitude coefficient k of the approach alert sound waveform signal is calculated based on the speaker temperature, and the approach alert sound waveform signal is corrected, so that the vehicle state and the sound pressure level of the vehicle approach alert sound have a certain constant relationship.

Further, in the above embodiment, the approach alert sound waveform signal itself output from the signal generator 21b equipped in the microcomputer 21 is a signal, which is already corrected. Alternatively, the voltage level of the approach alert sound waveform signal may be corrected by an external device of the microcomputer 21. For example, a voltage control unit is arranged on an outside of the microcomputer 21. The approach alert sound waveform signal before being corrected is input into the voltage control unit, and the microcomputer 21 outputs the control signal corresponding to the amplitude coefficient k. In this case, the voltage control unit corrects the voltage level of the approach alert sound waveform signal based on the control signal. Thus, similar effects as the first embodiment are obtained.

As described in the above embodiment, the vehicle approach alert device 2 may be separated from the speaker 3. Alternatively, the speaker 3 may be integrated with the vehicle approach alert device 2 so that a mechano-electric integrated type device is formed. Here, in case of the mechano-electric integrated type device, a wiring between the speaker 3 and the speaker temperature sensor is short, so that the temperature detection error is reduced, and therefore, it is preferable.

In the above embodiment, the speaker 3 is described as an example of the sound outputting body, and the sound pressure level of the vehicle approach alert sound actually output from the speaker 3 is set to be constant with reference to the speaker temperature. Alternatively, other sound outputting body may be used, and a similar treatment may be executed with reference to the sound outputting body temperature.

The above disclosure has the following aspects.

According to an example aspect of the present disclosure, a vehicle approach alert device includes: a microcomputer having a memory that stores approach alert sound data to be output, and a signal generator that reads out the approach alert sound data from the memory and generates an approach alert sound voltage waveform signal indicative of a vehicle approach alert sound to be output based on the approach alert sound data. The vehicle approach alert device alerts approach of a vehicle by outputting the vehicle approach alert sound from a sound outputting body according to the approach alert sound voltage waveform signal output from the microcomputer. The microcomputer further includes: an obtaining device that obtains a sound outputting body temperature as temperature of the sound outputting body; and a sound pressure correcting device that corrects a voltage level of the approach alert sound voltage waveform signal generated by the signal generator to be larger as the sound outputting body temperature obtained by the obtaining device increases. The signal generator outputs a corrected approach alert sound voltage waveform signal of the sound pressure correcting device.

In the above vehicle approach alert device, the voltage level of the approach alert sound voltage waveform signal is corrected according to the sound outputting body temperature, so that the sound pressure level of the vehicle approach alert sound actually output from the sound outputting body is constant. Accordingly, the change of the sound pressure of the outputting sound from the sound outputting body with respect to the temperature change is restricted, and the reduction of the warning efficiency is restricted. Thus, both of the noise reduction and the warning efficiency are satisfied even when the temperature of the sound outputting body is changed.

Alternatively, the sound pressure correcting device may calculate an amplitude coefficient, which becomes larger as the sound outputting body temperature obtained by the obtaining device increases. The sound pressure correcting device calculates the corrected approach alert sound voltage waveform signal by multiplying the amplitude coefficient by the approach alert sound voltage waveform signal before being corrected. The sound pressure correcting device outputs the corrected approach alert sound voltage waveform signal from the signal generator. In this case, the voltage level of the approach alert sound voltage waveform signal is corrected, and the change of the sound pressure of the outputting sound from the sound outputting body with respect to the temperature change is restricted.

Alternatively, the sound pressure correcting device may calculate the amplitude coefficient to set a sound pressure level of the vehicle approach alert sound actually output from the sound outputting body to be constant with respect to a change of the sound outputting body temperature. In this case, "to be constant" does not mean that it is necessary to be the same fixed sound pressure level. Instead, the sound pressure level may be within a predetermined range having a certain width.

Alternatively, the obtaining device may further obtain a vehicle travelling state. The signal generator changes the voltage level of the approach alert sound voltage waveform signal based on the vehicle travelling state obtained by the obtaining device. The sound pressure correcting device calculates the amplitude coefficient of the approach alert sound voltage waveform signal to set a relationship between the vehicle travelling state and the sound pressure level of the vehicle approach alert sound actually output from the sound outputting body to be constant with respect to a change of the sound outputting body temperature.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

The invention claimed is:

1. A vehicle approach alert device associated with a vehicle for providing a vehicle approach alert sound with noise reduction and warning efficiency based on temperature data of a sound outputting body, the device comprising:
   a microcomputer having a memory that stores vehicle approach alert sound data to be output via the sound outputting body, and a signal generator that reads out the vehicle approach alert sound data from the memory and generates a vehicle approach alert sound voltage waveform signal indicative of the vehicle approach alert sound to be output based on the vehicle approach alert sound data, wherein:
   the vehicle approach alert device alerts an approach of the vehicle by outputting the vehicle approach alert sound from the sound outputting body according to the vehicle approach alert sound voltage waveform signal output from the microcomputer;
   the microcomputer further includes:
   an obtaining device that obtains a sound outputting body temperature as the temperature data of the sound outputting body; and
   a sound pressure correcting device that corrects a voltage level of the vehicle approach alert sound voltage waveform signal generated by the signal generator to be larger as the sound outputting body temperature obtained by the obtaining device increases; and
   the signal generator outputs a corrected vehicle approach alert sound voltage waveform signal of the sound pressure correcting device;
   the sound pressure correcting device calculates an amplitude coefficient, according to the temperature data of the sound outputting body, which becomes larger as the sound outputting body temperature obtained by the obtaining device increases;
   the sound pressure correcting device calculates the corrected vehicle approach alert sound voltage waveform signal by multiplying the amplitude coefficient by the vehicle approach alert sound voltage waveform signal before being corrected;
   the sound pressure correcting device outputs the corrected vehicle approach alert sound voltage waveform signal to the signal generator;
   the obtaining device further obtains a vehicle travelling state; the signal generator changes the voltage level of the vehicle approach alert sound voltage waveform signal based on the vehicle travelling state obtained by the obtaining device; and
   the sound pressure correcting device calculates the amplitude coefficient of the vehicle approach alert sound voltage waveform signal to set a relationship between the vehicle travelling state and a sound pressure level of the vehicle approach alert sound actually output from the sound outputting body such that the sound pressure level of the vehicle approach alert sound actually output from the sound outputting body is constant with respect to a change of the temperature data of the sound outputting body when the vehicle travelling state of the vehicle is smaller than a predetermined speed.

2. The vehicle approach alert device according to claim 1, wherein the sound pressure correcting device calculates the amplitude coefficient of the vehicle approach alert sound voltage waveform signal to control the sound pressure level of the vehicle approach alert sound actually output from the sound outputting body to be constant with respect to the change of the sound outputting body temperature.

* * * * *